United States Patent
Voss

(10) Patent No.: US 7,602,074 B2
(45) Date of Patent: Oct. 13, 2009

(54) WIND POWER INSTALLATION HAVING AN AUXILIARY GENERATOR AND METHOD FOR THE CONTROL THEREOF

(75) Inventor: Eberhard Voss, Jornstorf (DE)

(73) Assignee: Nordex Energy GmbH, Norderstedt (DE)

( * ) Notice: Subject to any disclaimer, the term of this patent is extended or adjusted under 35 U.S.C. 154(b) by 190 days.

(21) Appl. No.: 11/596,777

(22) PCT Filed: May 13, 2005

(86) PCT No.: PCT/EP2005/005267

§ 371 (c)(1),
(2), (4) Date: Nov. 16, 2006

(87) PCT Pub. No.: WO2005/113964

PCT Pub. Date: Dec. 1, 2005

(65) Prior Publication Data

US 2008/0054641 A1    Mar. 6, 2008

(30) Foreign Application Priority Data

May 18, 2004    (DE) .................. 10 2004 024 563

(51) Int. Cl.
*H02P 9/00* (2006.01)
(52) U.S. Cl. .................................... 290/44
(58) Field of Classification Search .................. 290/44
See application file for complete search history.

(56) References Cited

U.S. PATENT DOCUMENTS

| | | | |
|---|---|---|---|
| 4,556,801 A * | 12/1985 | Gervasio et al. ............... 290/44 |
| 5,083,039 A * | 1/1992 | Richardson et al. ............ 290/44 |
| 7,218,012 B1 * | 5/2007 | Edenfeld ........................ 290/44 |
| 7,418,820 B2 * | 9/2008 | Harvey et al. .................. 60/487 |
| 7,449,794 B2 * | 11/2008 | Guey et al. .................... 290/44 |
| 2005/0280264 A1 * | 12/2005 | Nagy ............................ 290/55 |
| 2008/0129050 A1 * | 6/2008 | Guey et al. .................... 290/43 |

FOREIGN PATENT DOCUMENTS

| | | |
|---|---|---|
| DE | 368 799 | 2/1923 |
| DE | 27 42 559 | 10/1978 |
| DE | 196 44 705 A1 | 4/1998 |
| DE | 200 20 232 U1 | 2/2002 |

(Continued)

OTHER PUBLICATIONS

Computer Translation of JP08322297A.*

*Primary Examiner*—Joseph Waks
(74) *Attorney, Agent, or Firm*—Vidas, Arrett & Steinkraus, P.A.

(57) ABSTRACT

A wind power installation with a rotor, a generator for generating electric power, at least one rotatably mounted rotor blade displaceable about its longitudinal axis for adjusting the angle of attack, and an auxiliary generator for generating electric power for at least one consumer, characterized in that the auxiliary generator produces electricity for a controller for the rotor blade adjustment and for a drive for adjusting the angle of attack of at least one rotor blade at a lower range of rotational speed in comparison to the rotational speed in normal operation, wherein the controller for the angle of attack is controlled or regulated for sustained operation in the range of the rotational speed.

21 Claims, 2 Drawing Sheets

FOREIGN PATENT DOCUMENTS

| | | |
|---|---|---|
| DE | 100 09 472 C2 | 6/2002 |
| DE | 101 53 644 C2 | 11/2003 |
| DE | 102 33 589 A1 | 11/2003 |
| EP | 1 286 049 A2 | 8/2002 |
| JP | 08322297 A * | 12/1996 |
| JP | 2003056446 A * | 2/2003 |

* cited by examiner

WIND POWER INSTALLATION HAVING AN AUXILIARY GENERATOR AND METHOD FOR THE CONTROL THEREOF

CROSS-REFERENCE TO RELATED APPLICATIONS

Not applicable.

STATEMENT REGARDING FEDERALLY SPONSORED RESEARCH

Not applicable.

BACKGROUND OF THE INVENTION

The present invention relates to a wind power installation comprising a rotor and a generator driven by the rotor for generating electric power. At least one rotor blade is mounted in a rotor hub so as to be displaceable about its longitudinal axis. The wind power installation comprises an auxiliary generator driven by the rotor for generating electric power for at least one consumer.

A wind power installation having a multi-stage generator is known from DE 102 33 589 A1, the entire contents of which is incorporated hereby by reference. Different generator stages which are selectively connected or disconnected are provided in the wind power installation for different wind speeds. The multiple stages of the generator are intended to make effective use of a wide range of different wind strengths for generating electricity.

An adjusting apparatus for rotor blades is known from DE 196 44 705, the entire contents of which is incorporated hereby by reference. In adjusting the rotor blades, same are brought into an angled position, the so-called flag position, at which the wind power installation comes to a standstill. The adjusting apparatus comprises an auxiliary generator which is installed in fixed inter-connection with the nacelle/rotor and which derives power from the rotational motion of the rotor relative the nacelle. The rotor blades are rotated directly into the flag position by the power thus derived.

An apparatus for adjusting the angle of attack of a rotor blade having an emergency current circuit is known from DE 100 09 472 C2, the entire contents of which is incorporated hereby by reference. The emergency current circuit comprises a permanent magnet generator which connects to the motors for adjusting the angle of attack such that same is set into the flag position after the emergency current circuit switches on. A high velocity to the rotor blades is hereby also achieved upon a high rotational speed to the rotor shaft.

A wind power installation providing contactless power transmission from a non-rotating part of the wind power installation to the rotor is known from DE 101 53 644 C2, the entire contents of which is incorporated hereby by reference. For this purpose, an asynchronous machine is integrated into the wind power installation, the stator of which is connected to the non-rotating part of the wind power installation and the rotor of which is arranged at the rotating part.

A control apparatus for a wind power installation is known from DE 368 799, the entire contents of which is incorporated hereby by reference, in which a self-excited and separately-excited generator are operated together with accumulators such that voltage is maintained automatically and the fluctuating power consumptions of the connected consumers are covered.

Known from EP 1 286 049 A2, the entire contents of which is incorporated hereby by reference, is a wind power installation having a stabilizing device which actively stabilizes the rotor in a low-load rotational position (park position). Additionally known is its own energy supply means, in particular in the form of an auxiliary wind power installation mounted on the machine gondola of the wind power installation.

Modern wind power installations frequently have an adjusting device, the so-called pitch drive, which can adjust the rotor blade about its longitudinal axis, thereby enabling an adjustment to different wind velocities.

If it becomes necessary to shut down such a wind power installation, the pitch drive brings the rotor blades into their flag position; i.e., the rotor blades are essentially positioned at right angles (90°) to their normal orientation. In this position, the rotor can be kept in a permanent standstill by a holding brake or by different stabilizing means. However, the rotor is frequently not kept at a standstill by a brake, instead the rotor spins in the wind; i.e., it rotates as thereby also does the drive train including the generator connected to the rotor, whereby the generator is disconnected from the power system. This condition is known as spinning mode. In this case, depending on wind velocity and direction, an irregular rotational speed of a few revolutions per minute commences, compared to the rotational speed in normal operation of the wind power installation being substantially higher, for example in the range of 15-20 revolutions per minute.

It is generally required for the rotor blades to be able to be set into the flag position also in the event of a power outage. For this purpose, energy stores are usually provided, for example accumulators or condensers for electrical pitch drives and accumulators for hydraulic pitch drives, which provide the power necessary for a one-time adjustment of the rotor blades into the flag position. Energy stores are frequently dimensioned such that they are depleted following this one-time displacement process and are not recharged until resumption of normal operation. DE 200 20 232 U1 proposes the use of an auxiliary generator in order to reliably rotate the rotor blades into the flag position.

For temporarily supplying the controller of the wind power installation in the case of power failure, a commercial, uninterruptible power supply (UPS) based on accumulators is usually provided, same being configured so as to supply the controller of the wind power installation with power for a short period of time so that, for example, a status signal can be sent via a remote monitoring system indicating that the operating system has been properly shut down and/or the controller switched off.

Required in the case of ocean (off-shore) wind power installations is that the wind power installations also be capable of supplying essential components with emergency power for several days or weeks in the event of longer power supply system outages. For this purpose, it is common to provide for a diesel generator, which must be supplied with an accordingly large quantity of diesel. Substantial maintenance costs are necessary to ensure a faultless state to the diesel and the diesel generator; among other things, the diesel must be continually or at least regularly recycled and replaced at specific intervals. The expenditure for this is substantial, in addition working with diesel fuel off-shore leads to environmental endangerment.

It is an object of the present invention to provide an emergency power supply in the event of power failure which can be produced at low expense, requires low maintenance in normal operation, and represents no danger to the environment.

BRIEF SUMMARY OF THE INVENTION

The wind power installation according to the invention comprises a rotor and a generator driven by same for generating electricity which is intended in particular to be supplied to a power system. At least one rotor blade rotatable about its longitudinal axis is mounted in a rotor hub. A rotor-driven auxiliary generator for generating electricity for at least one consumer is furthermore provided. According to the invention, the auxiliary generator is designed for a rotational speed of the rotor set for a rotor blade adjusted into the flag position. This rotational speed is lower than the rotational speed in normal operation. Particularly at the rotational speed in spinning mode, the auxiliary generator generates electricity for the consumer(s). The invention is based on the recognition that when the wind power installation is spinning, the low rotational speed given for operating the auxiliary generator can be utilized in this manner to sustainably and reliably ensure an emergency power supply. In particular in the case of off-shore wind power installations which must also be designed for a power outage lasting several days or weeks, the auxiliary generator affords a reliable power supply. In order for the wind power installation to be sustained in operating mode, the auxiliary generator provides a controller for the rotor blade adjustment and at least one motor for adjusting the angle of attack of the rotor blade. In this design, the auxiliary generator also enables the control of the angle of attack of at least one rotor blade in spinning mode so as to result in controlled or regulated operation of the wind power installation in spinning mode. The angle of attack of the rotor blade is controlled by the controller in order to obtain a rotational speed for which the auxiliary generator is designed. The controller controls and/or regulates the angle of attack of at least one rotor blade so as to operate the auxiliary generator at a low rotational speed on a sustained basis. Preferably, each rotor blade is provided with a motor for adjusting the angle of attack, wherein each of the motors are supplied by the auxiliary generator. This design enables the angle of attack of all rotor blades to also be adjusted in spinning mode and thus ensures a regulated spinning mode under different conditions.

In a further preferred design, the auxiliary generator supplies a controller for the angle of the machine gondola (azimuth angle) and an azimuth drive for adjusting the angle of the machine gondola. In this design, the auxiliary generator enables the orientation of the machine gondola and thus the rotor in the wind during spinning mode. By so doing, also wind power installations which have been shut down can actively follow changing wind directions so that the wind power installation receives less load, even in strong wind.

One preferred development provides for switching means for switching on the auxiliary generator for actuation by the rotor during a network power supply outage. Said switching means are preferably of mechanical, hydraulic, pneumatic and/or electrical configuration. In one feasible design, a mechanical coupler is provided as the switching means which is opened in normal operation of the wind power installation and closes automatically in the event of power failure, wherein the coupler preferably closes in time-delayed manner such that the delay allows for the rotational speed to already be decreased by the wind-rotated rotor blades.

In another design, the coupler is opened electrically and/or hydraulically and closed by spring action. It is alternatively conceivable to provide a switching means operating under centrifugal force which opens upon the exceeding of a first predefined rotational speed and closes upon falling below a second predefined rotational speed. The first predefined rotational speed can hereby be the same as or different from the second predefined rotational speed.

One feasible design of the wind power installation according to the invention provides for a brake which is applied prior to the auxiliary generator switching on until a rotational speed specified for the auxiliary generator is reached.

In one feasible design, the auxiliary generator is driven continuously by the rotor and electrical switching means do not produce an electrical connection with the consumers until the rotational speed specified for the auxiliary generator is reached.

In continuation of the afore-mentioned design, the switching means comprises a contactor which is open during normal operation and which closes upon power failure preferably in a time-delayed manner. The switching means furthermore comprises an additional rectifier, converter and/or inverter which converts the power generated by the auxiliary generator in the manner as required by the consumer to be supplied and provides it as direct or alternating current.

In a likewise preferred design, the auxiliary generator is coupled to the rotor by means of a drive, wherein the drive preferably has a transmission ratio in order to power the auxiliary generator for generating electricity at a number of revolutions per minute to the rotor of the wind power installation which is less than 15 revolutions per minute. For example, the transmission ratio is configured to have a range of rotational speed for the auxiliary generator of from two to eight revolutions per minute. It is further preferred for the auxiliary generator to be configured such that at a transmission ratio for a rotational speed of from four to six revolutions per minute, a sufficient provision of electricity will thereby ensue. Future wind power installations having very large diameters can also generate power with the auxiliary generator at significantly lower rotational speeds.

The auxiliary generator is preferably of a self-excited or permanently-excited configuration. Alternatively, a generator with separate excitation can be used for which the excitation power is provided by an energy store, for example an accumulator. Additionally, a practical continuation provides for at least one accumulator in the wind power installation which ensures an uninterruptible power supply, wherein the accumulator is supplied by the auxiliary generator and in particular recharged in the event of power failure. It is likewise conceivable to configure the generator such that the switching means can operate same as an auxiliary generator.

The object according to the invention is likewise achieved by a method for controlling a wind power installation. The wind power installation comprises at least one rotor blade, the angle of attack of which is adjustable about its longitudinal axis. The method is characterized by a mode of operation in which the rotor blade rotates at a slower rotational speed compared to its regular operation. The rotor preferably has, as mentioned above, a rotational speed of less revolutions per minute, while the rotational speed during normal operation is from 15 to 20 revolutions per minute. The auxiliary generator configured for this range of rotational speed generates electricity applicable for controlling the angle of attack of the rotor blade. The controller sets the angle of attack of the rotor blade such that the wind power installation is driven at the reduced rotational speed mode of operation on a sustained basis. The auxiliary generator hereby supplies the controller and a drive for adjusting of the rotor blades. The angle of attack adjustment can hereby be regulated or controlled.

BRIEF DESCRIPTION OF SEVERAL VIEWS OF THE DRAWINGS

The following will make reference to the figures in describing the present invention in greater detail.

DETAILED DESCRIPTION OF THE INVENTION

While this invention may be embodied in many different forms, there are described in detail herein a specific preferred embodiment of the invention. This description is an exemplification of the principles of the invention and is not intended to limit the invention to the particular embodiment illustrated.

Figure 1:
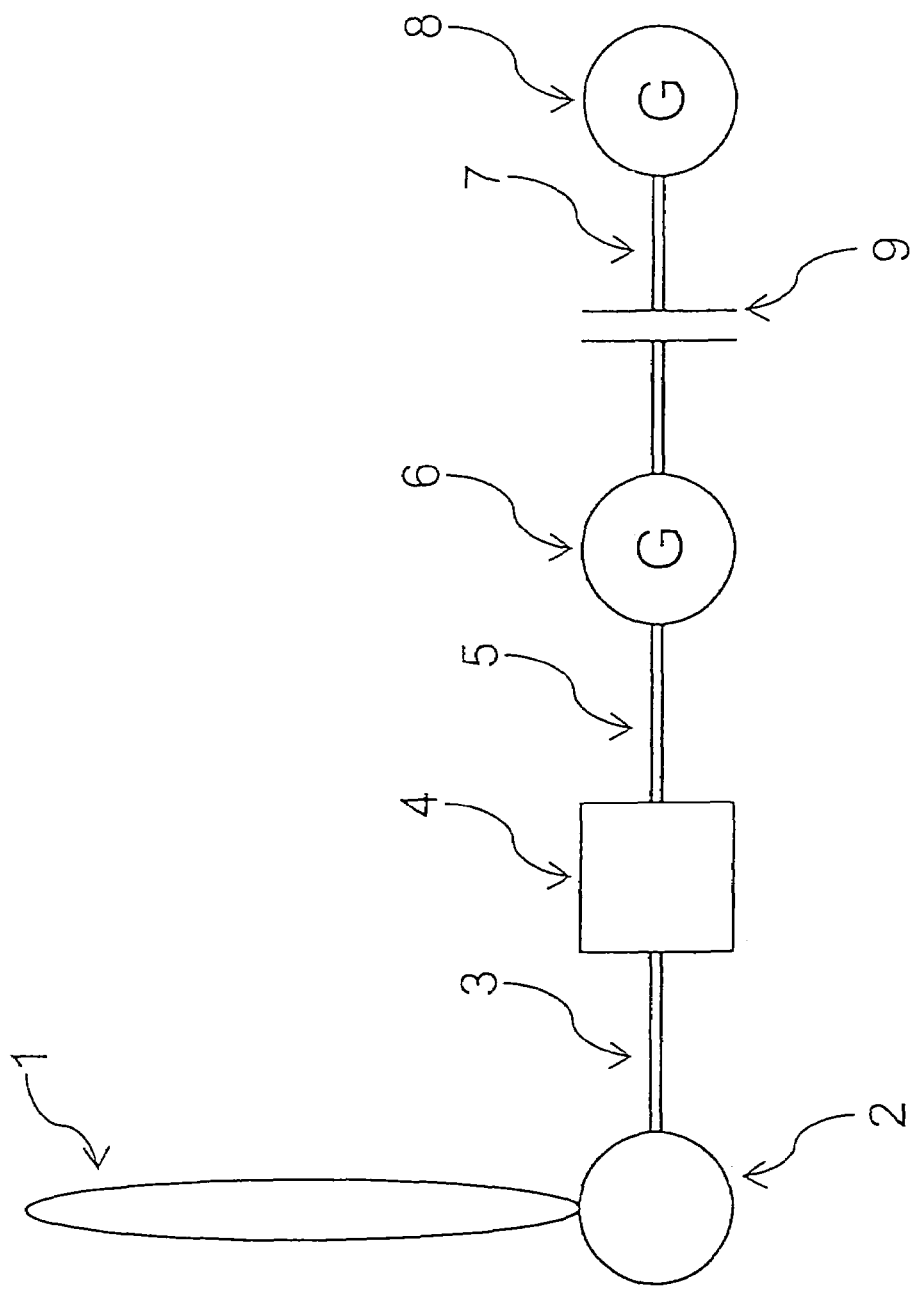
FIG. 1 a schematic view of the drive train of a wind power installation according to the invention, and FIG. 2 a block diagram comprising the essential components of the wind power installation to be supplied by the auxiliary generator.

FIG. 1 shows a schematic view of a drive train for a wind power installation comprising a rotor blade 1 mounted displaceably in a rotor hub 2. The rotor shaft 3 leads to a drive 4, the output shaft of which forms the generator shaft 5 for the generator 6. In normal operation, the wind power installation has a rotational speed of, for example, approximately 15-20 revolutions per minute which the drive 4 converts into the appropriate rotational speed for the generator 6. Of course, gearless drive trains also exist.

An automatic coupler 9 connected to a generator shaft 7 of an auxiliary generator 8 is provided on an output shaft of the generator 6.

The drive train shown works as follows: when power is lost, the rotor blades are rotated into the flag position by an auxiliary motor which is fed by a generator or an energy store (not shown). The wind power installation thereby switches over to spinning mode in which the rotor has a rotational speed of approximately four to six revolutions per minute. Upon the approximate approaching of the rotational speed, the coupler 9 closes so that the auxiliary generator 8 can be driven by the rotor. The electricity provided by the auxiliary generator 8, on an order of magnitude of some kilowatts, suffices to supply the essential components of the wind power installation in the event of power loss such as, for example, the controller, wind sensors, pitch and azimuth systems, hydraulic systems, signaling devices, obstruction lights for ships and aircraft and the like. As will be described in the following, the power provided by the auxiliary generator 8 even allows a control or regulation of the spinning mode.

Figure 2:
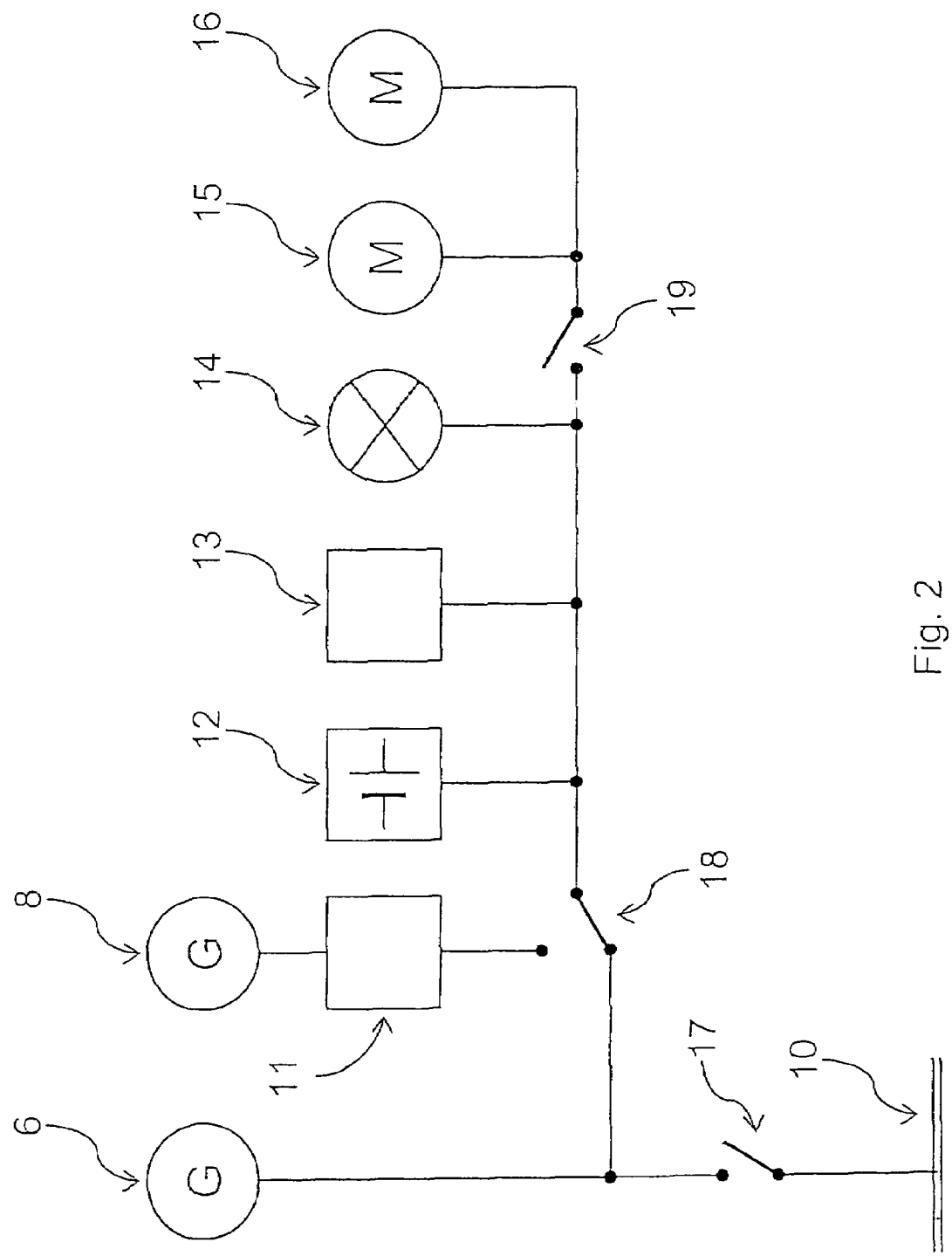

FIG. 2 shows the connections of the wind power installation in a block diagram. In normal operation, the electricity generated at generator 6 is supplied to the power system through the closed switch 17. The electrical consumers, for example the controller 13, the signaling devices and obstruction light 14, as well as the azimuth system 15 and the pitch system 16 are supplied with electricity from the power system—from generator 6 respectively.

When the wind power installation needs to be disconnected from the power system, for example due to a power supply outage, the switch 17 opens. In this event, the uninterruptible power supply 12 assumes the supplying of the consumers for a short period of time, the controller 13 and the signaling devices and obstruction light 14 in particular. In addition, the pitch drives, which are an integral part of the pitch system 16, set the rotor blades into the flag position. The power necessary for this is taken from energy stores which are likewise an integral part of the pitch system 16. The adjusting of the rotor blades into the flag position reduces the rotational speed of the rotor. At an appropriate rotational speed, switch 18 is thrown and the electricity generated by the auxiliary generator 8 is converted into the appropriate alternating current for the consumers by means of converter 11. The uninterruptible power supply 12 can hereby be recharged, the controller 13 can resume operation as necessary and assume control tasks, furthermore the signaling devices and obstruction light 14 can be operated. With the normally closed switch 19, supply of the azimuth system 15 and the pitch system 16 continues.

Of course, a converter 11 can be omitted when the components 12 . . . 16 of the wind power installation are capable of being operated directly by the power generated by the auxiliary generator 8.

The auxiliary generator 8 ensures at least the supply of the controller 13 of the wind power installation and the pitch system 16 as well as the supply of at least one pitch drive so that at least one rotor blade in the wind power installation can be set to a position other than the flag position. In the case of spinning mode control, the rotor blade is adjusted such that the rotational speed of the rotor is within a range which effects an especially favorable rotational speed for the generator shaft 7 for operating of the auxiliary generator 8, for example 400-500 revolutions per minute. This allows a control of the spinning mode and the achieving of a constant provision of energy.

The auxiliary generator 8 can supply power to at least the controller 13 of the wind power installation and the azimuth system, the wind sensors, the azimuth drives and—if provided—the hydraulic system. The wind direction is determined in particular by the wind sensors so that the controller 13 receives an input variable as to which direction the wind power installation needs to track. The hydraulic system needs to be supplied with power if the wind power installation is equipped with azimuth brakes which need to be hydraulically ventilated upon tracking of the wind power installation. It is hereby possible to track and set the wind power installation in blowing wind such that as little load as possible acts upon it. In particular, the wind power installation is positioned such that the rotor points toward the wind.

When a calm sets in, supply from the auxiliary generator 8 is no longer possible. In this case, another supplying of the controller 13 and the signaling devices and obstruction light 14 is needed, which is assumed by the uninterruptible power supply 12. Operation of the azimuth system 15 and the pitch system 16 is then unnecessary and these components are disconnected from the supply by the opening of switch 19.

The controller 13 is connected with the remaining components of the wind power installation by means of (not shown) control lines, a local communication network or other connecting means in order to control them and to receive their performance data and measurement readings.

Safety guidelines for modern wind power installations stipulate that wind power installations which have been shut down upon power failure be capable of weathering storms of a certain intensity with changing wind direction without damage. When the wind power installation can actively follow changing wind direction, it can then be configured for the dimensioned load at substantial material savings to the various different components and there is greater probability that the wind power installation will weather extreme wind conditions undamaged.

The above disclosure is intended to be illustrative and not exhaustive. This description will suggest many variations and alternatives to one of ordinary skill in this art. All these alternatives and variations are intended to be included within the scope of the claims where the term "comprising" means "including, but not limited to". Those familiar with the art may recognize other equivalents to the specific embodiments described herein which equivalents are also intended to be encompassed by the claims.

Further, the particular features presented in the dependent claims can be combined with each other in other manners within the scope of the invention such that the invention should be recognized as also specifically directed to other embodiments having any other possible combination of the features of the dependent claims. For instance, for purposes of claim publication, any dependent claim which follows should be taken as alternatively written in a multiple dependent form from all prior claims which possess all antecedents referenced in such dependent claim if such multiple dependent format is an accepted format within the jurisdiction (e.g. each claim depending directly from claim 1 should be alternatively taken as depending from all previous claims). In jurisdictions where multiple dependent claim formats are restricted, the following dependent claims should each be also taken as alternatively written in each singly dependent claim format which creates a dependency from a prior antecedent-possessing claim other than the specific claim listed in such dependent claim below.

This completes the description of the preferred and alternate embodiments of the invention. Those skilled in the art may recognize other equivalents to the specific embodiment described herein which equivalents are intended to be encompassed by the claims attached hereto.

The invention claimed is:

1. A wind power installation comprising:
    a rotor;
    a generator for generating electric power,
    at least one rotatably mounted rotor blade (1) displaceable about its longitudinal axis for adjusting the angle of attack, and
    an auxiliary generator (8) for generating electric power for at least one consumer (12, 13, 14, 15, 16), characterized in that
    the auxiliary generator (8) produces electricity for a controller for the rotor blade adjustment and for a drive for adjusting the angle of attack of the at least one rotatably mounted rotor blade at a lower range of rotational speed in comparison to the rotational speed in normal operation, wherein the controller for the angle of attack is controlled or regulated for sustained operation in the range of the rotational speed, and
    further characterized in that switching means are provided which switch on the auxiliary generator as an emergency power supply for actuation by the rotor in the event of a network power supply outage.

2. A wind power installation according to claim 1, characterized in that each at least one rotatably mounted rotor blade is provided with one drive each for adjusting the angle of attack, each of which can be supplied by the auxiliary generator (8).

3. A wind power installation according to claim 1, characterized in that a controller for the angle of a machine gondola and an azimuth drive for adjusting the orientation of the machine gondola with the rotor is provided, wherein the azimuth drive is supplied with power by the auxiliary generator (8).

4. A wind power installation according to claim 1, characterized in that the switching means (9) are of mechanical, hydraulic, pneumatic and/or electrical configuration.

5. A wind power installation according to claim 4, characterized in that a coupler (9) which is opened in normal operation and which closes automatically in the event of power failure is provided as said switching means.

6. A wind power installation according to claim 5, characterized in that the coupler (9) closes in time-delayed manner.

7. A wind power installation according to claim 5, characterized in that the coupler (9) is opened mechanically, pneumatically, electrically and/or hydraulically in normal operation.

8. A wind power installation according to claim 5, characterized in that the coupler opens automatically upon the exceeding of a first predefined rotational speed and closes automatically upon falling below a second predefined rotational speed.

9. A wind power installation according to claim 8, characterized in that the first predefined rotational speed is equal to the second predefined rotational speed.

10. A wind power installation according to claim 8, characterized in that the second predefined rotational speed corresponds approximately to the rotational speed for the auxiliary generator (8).

11. A wind power installation according to claim 4, characterized in that a brake is provided which is applied prior to the auxiliary generator switching on until a rotational speed specified for the auxiliary generator is reached.

12. A wind power installation according to claim 1, characterized in that the auxiliary generator (8) is driven by the rotor during normal operation and an electrical connection with the consumers (12, 13, 14, 15, 16) is produced when the rotational speed specified for the auxiliary generator is reached.

13. A wind power installation according to claim 12, characterized in that the switching means comprises a contactor which is open during normal operation and which closes upon power failure.

14. A wind power installation according to claim 13, characterized in that the contactor closes in a time-delayed manner.

15. A wind power installation according to claim 12, characterized in that the switching means additionally comprises a rectifier, converter and/or inverter.

16. A wind power installation according to claim 1, characterized in that the auxiliary generator (8) is coupled to the rotor by means of a drive (4).

17. A wind power installation according to claim 1, characterized in that the auxiliary generator (8) is of self-excited or permanently-excited configuration.

18. A wind power installation according to claim 1, characterized in that the auxiliary generator (8) is of separate-excited configuration.

19. A wind power installation according to claim 1, characterized in that the generator (6) comprises switching means which allows operation of the generator (6) as an auxiliary generator in a connected state.

20. A wind power installation according to claim 1, characterized in that at least one accumulator is additionally provided for an uninterruptible power supply which the auxiliary generator supplies as a consumer.

21. A method for the control of a wind power installation having at least one rotor blade, the angle of attack of which is adjustable about its longitudinal axis, characterized by:
    providing the wind power installation of claim 1; further characterized by:
    a mode of operation at a slower rotational speed compared to normal operation at which an auxiliary generator generates electrical power, and
    a controller which adjusts the angle of attack of the rotor blade for a sustained operation of the auxiliary generator at the reduced rotational speed, wherein at least the controller and one drive for adjusting the rotor blade are supplied by the auxiliary generator.

* * * * *